US012777167B2

(12) United States Patent
Mitra et al.

(10) Patent No.: US 12,777,167 B2
(45) Date of Patent: Oct. 27, 2026

(54) ACTION RECOGNITION USING COMPRESSED FRAME FEATURES

(71) Applicant: ADOBE INC., San Jose, CA (US)

(72) Inventors: Subrata Mitra, Bangalore (IN); Aniruddha Mahapatra, Kolkata (IN); Kuldeep Sharad Kulkarni, Ilkal (IN); Abhishek Yadav, Lucknow (IN); Abhijith Kuruba, Kurnool (IN); Manoj Kilaru, Hyderabad (IN)

(73) Assignee: ADOBE INC., San Jose, CA (US)

( * ) Notice: Subject to any disclaimer, the term of this patent is extended or adjusted under 35 U.S.C. 154(b) by 1062 days.

(21) Appl. No.: 17/651,076

(22) Filed: Feb. 15, 2022

(65) Prior Publication Data

US 2023/0262237 A1 Aug. 17, 2023

(51) Int. Cl.

*H04N 19/172* (2014.01)
*H04N 19/176* (2014.01)
*H04N 19/61* (2014.01)
*H04N 19/132* (2014.01)

(52) U.S. Cl.

CPC ......... *H04N 19/176* (2014.11); *H04N 19/172* (2014.11); *H04N 19/61* (2014.11); *H04N 19/132* (2014.11)

(58) Field of Classification Search

None
See application file for complete search history.

(56) References Cited

U.S. PATENT DOCUMENTS

| | | | | |
|---|---|---|---|---|
| 10,909,728 | B1 * | 2/2021 | Appalaraju | G06N 20/10 |
| 11,301,684 | B1 * | 4/2022 | Kumar | G06V 20/41 |
| 11,315,354 | B2 * | 4/2022 | Wang | G06N 3/045 |
| 2018/0144248 | A1 * | 5/2018 | Lu | G06F 18/24133 |
| 2021/0019612 | A1 * | 1/2021 | Carrasco | G06N 5/01 |
| 2021/0210119 | A1 * | 7/2021 | Jia | G06V 20/48 |
| 2021/0281867 | A1 * | 9/2021 | Golinski | G06N 3/045 |
| 2021/0289227 | A1 * | 9/2021 | Zhu | G06V 10/82 |
| 2022/0051061 | A1 * | 2/2022 | Chi | G06N 3/045 |
| 2022/0239944 | A1 * | 7/2022 | Zhang | H04N 19/109 |
| 2022/0374635 | A1 * | 11/2022 | Xiong | G06T 7/70 |

(Continued)

OTHER PUBLICATIONS

Tran, et al., "ConvNet Architecture Search for Spatiotemporal Feature Learning", arXiv preprint arXiv:1708.05038v1 [cs.CV] Aug. 16, 2017, 12 pages.

(Continued)

*Primary Examiner* — Jessica M Prince
(74) *Attorney, Agent, or Firm* — F. CHAU & ASSOCIATES, LLC

(57) ABSTRACT

Systems and methods for image processing are described. The systems and methods include receiving a plurality of frames of a video at an edge device, wherein the video depicts an action that spans the plurality of frames, compressing, using an encoder network, each of the plurality of frames to obtain compressed frame features, wherein the compressed frame features include fewer data bits than the plurality of frames of the video, classifying, using a classification network, the compressed frame features at the edge device to obtain action classification information corresponding to the action in the video, and transmitting the action classification information from the edge device to a central server.

20 Claims, 16 Drawing Sheets

(56) References Cited

U.S. PATENT DOCUMENTS

| | | | | |
|---|---|---|---|---|
| 2023/0319297 | A1* | 10/2023 | Kim | H04N 19/105 375/240.26 |
| 2023/0344962 | A1* | 10/2023 | Tran | G06N 3/0464 |
| 2023/0412796 | A1* | 12/2023 | Liu | H04N 19/85 |

OTHER PUBLICATIONS

Kang, et al., "NoScope: Optimizing Neural Network Queries over Video at Scale", Proceedings of the VLDB Endowment, vol. 10, No. 11, 2017, Available at https://www.vldb.org/pvldb/vol10/p1586-kang.pdf, 12 pages.
Hsieh, et al., "Focus: Querying Large Video Datasets with Low Latency and Low Cost", arXiv preprint arXiv:1801.03493v1 [cs.DB] Jan. 10, 2018, 15 pages.
Tran, et al., "Learning Spatiotemporal Features with 3D Convolutional Networks", arXiv preprint arXiv:1412.0767v4 [cs.CV] Oct. 7, 2015, 16 pages.
Wu, et al., "Video Compression through Image Interpolation", arXiv preprint arXiv:1804.06919v1 [cs.CV] Apr. 18, 2018, 18 pages.
He, et al., "Deep Residual Learning for Image Recognition", arXiv preprint arXiv:1512.03385v1 [cs.CV] Dec. 10, 2015, 12 pages.
Wu, et al., "Compressed Video Action Recognition", arXiv preprint arXiv:1712.00636v2 [cs.CV] Mar. 29, 2018, 14 pages.
Soomro, et al., "UCF101: A Dataset of 101 Human Actions Classes From Videos in The Wild", arXiv preprint arXiv:1212.0402v1 [cs.CV] Dec. 3, 2012, 7 pages.
Singh, et al., 2016, "A Multi-Stream Bi-Directional Recurrent Neural Network for Fine-Grained Action Detection", In 2016 IEEE Conference on Computer Vision and Pattern Recognition, p. 1961-1970, Available at https://openaccess.thecvf.com/content_cvpr_2016/papers/Singh_A_Multi-Stream_Bi-Directional_CVPR_2016_paper.pdf, 10 pages.
Ronneberger, et al., "U-net: Convolutional Networks for Biomedical Image Segmentation", arXiv preprint arXiv:1505.04597v1 [cs.CV] May 18, 2015, 8 pages.

* cited by examiner

ACTION RECOGNITION USING COMPRESSED FRAME FEATURES

BACKGROUND

The following relates generally to image processing, and more specifically to video analysis.

Video analysis is a form of image processing that is often performed on digital video frames that have been processed through algorithmic or machine learning techniques to gain insight into settings, actions, and/or behaviors. Cameras may be deployed in various locations to gather the video data. Such video data can be mined using analytic techniques to provide an understanding of human behavior recorded in the video, such as navigation paths, time spent at different locations, actions etc.

However, mining and analyzing such a large volume of continuously collected data is not a trivial task. Video data is substantially large and aggregating such data from a large number of edge locations to a central location to be mined and analyzed may be expensive and even infeasible due to inadequate internet bandwidth.

SUMMARY

A method for video analysis is described. One or more aspects of the method, apparatus, non-transitory computer readable medium, and system include receiving a plurality of frames of a video at an edge device, wherein the video depicts an action that spans the plurality of frames, compressing, using an encoder network, each of the plurality of frames to obtain compressed frame features, wherein the compressed frame features include fewer data bits than the plurality of frames of the video, classifying, using a classification network, the compressed frame features at the edge device to obtain action classification information corresponding to the action in the video, and transmitting the action classification information from the edge device to a central server.

A method for video analysis is described. One or more aspects of the method, apparatus, non-transitory computer readable medium, and system include compressing a plurality of frames of a training video using an encoder network to obtain compressed frame features; classifying the compressed frame features using a classification network to obtain action classification information for an action in the video that spans the plurality of frames of the video; and updating parameters of the classification network by comparing the action classification information to ground truth action classification information.

An apparatus for video analysis described. One or more aspects of the apparatus, system, and method include an encoder network configured to compress each of a plurality frames of a video to obtain compressed frame features, wherein the encoder network is trained to compress the video frames by comparing the video frames to reconstructed frames that are based on the compressed frame features; and a classification network configured to classify the compressed frame features to obtain action classification information for an action in the video that spans the plurality of frames of the video.

DETAILED DESCRIPTION

Figure 1:
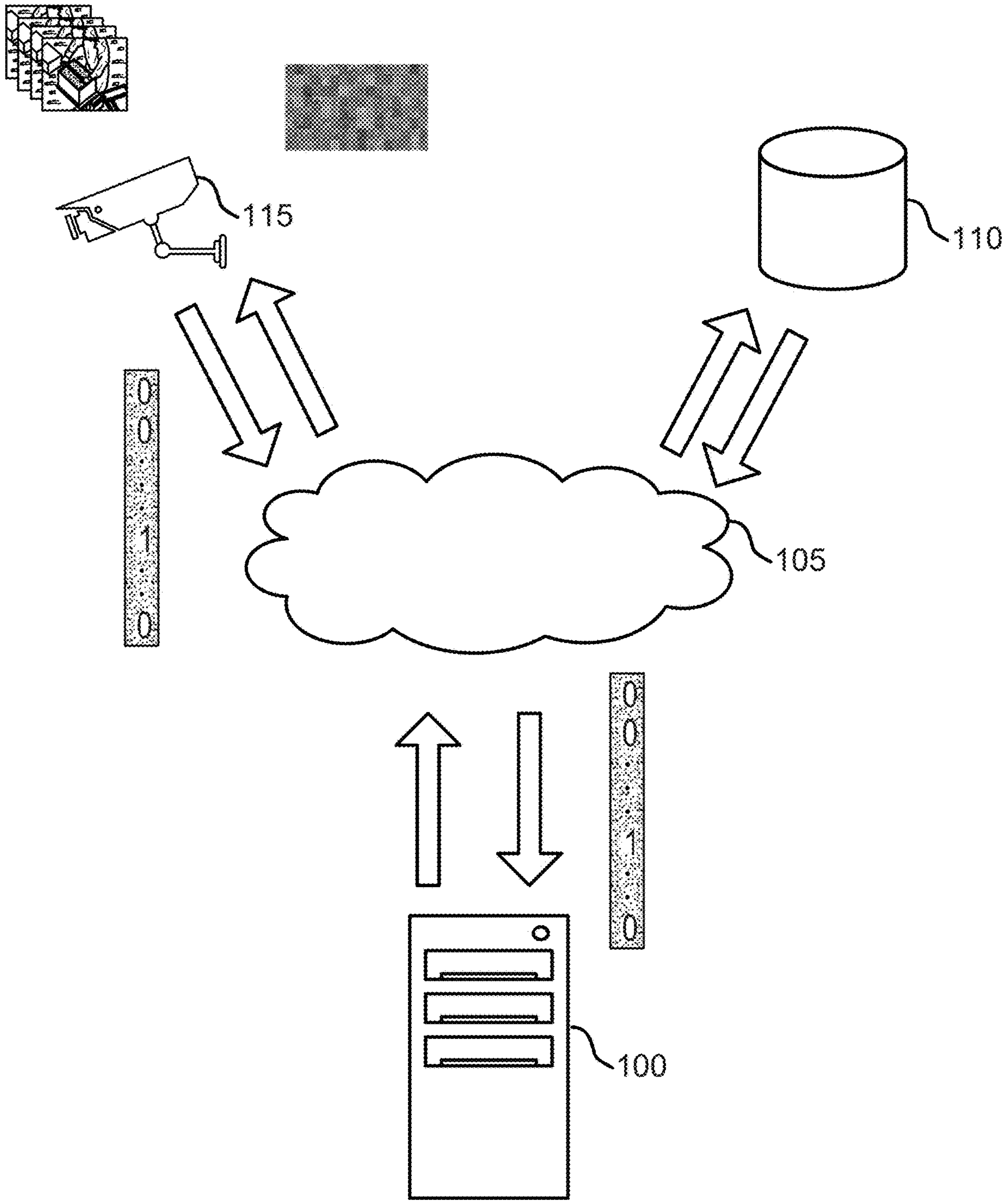
FIG. 1 shows an example of an image processing system according to aspects of the present disclosure.

The present disclosure describes systems and methods for video analytics that can obtain action classification information from compressed video data.

Video analysis systems may employ machine learning models to analyze video data to collect information about customer behavior. Current video analysis systems rely on collecting video data and sending the uncompressed video data to a central server for analysis. However, the amount of raw video data collected can be enormous if video data is collected from numerous edge locations and transmission of the raw video data to the central server can be time consuming, requires large amounts of computing processing resources, bandwidth intensive and expensive. Accordingly, embodiments of the present disclosure provide a video analysis system that receives a plurality of frames of a video, compresses the plurality of frames to obtain compressed frame features and classifies the compressed frame features at edge locations prior to sending the video data to the central server. Machine learning and deep learning may be used to compress and classify the received video data, where the classification data corresponds to an action recorded in the video.

Accordingly, by compressing and performing analysis on compressed frame features, rather than on raw video, at edge locations (e.g., at a location in which the video was recorded) before the video frames are sent to the central server, the size of the machine learning models is reduced and networks employed by embodiments of the inventive concept require much less bandwidth.

At least one embodiment of the present disclosure is used in an action recognition context. For example, an edge device that includes a camera communicates with a central server via a cloud. The edge device captures a video (either in grayscale or RGB). The edge device compresses the video. The edge device classifies the compressed video to obtain action classification information corresponding to an action recorded in the video. For example, in an embodiment, the edge device uses one or more convolutional neural networks that have been trained to recognize spatial, temporal, and/or color components depicted in the compressed frame features to extract spatial and temporal components relating to the motion of objects, human actions, human-scene or human-object interaction, and appearance of those objects, humans, and scenes, and output a final prediction of a likelihood that the compressed frame features depict a given action (i.e., action classification information). The edge device then sends the action classification information to the central server via the cloud.

The term "video analysis" refers to a process of gathering data and making inferences about the contents of video data. For example, video analysis can be used to identify actions that occur in a video.

The term "action classification information" refers to information gained from analyzing video data that relates to an action depicted in the video data. For example, in an embodiment, action classification information is a numerical prediction of a likelihood that the video data depicts a given action.

The term "compressed frame features" refers to a compressed representation of video data generated by an encoder network. Compression refers to the process or representing a number of information bits using fewer information bits. Compression can be lossless (in which case the original signal can be reconstructed exactly) or lossy (in which the original signal can not be perfectly reconstructed).

The term "reconstructed frames" refers to images (e.g., frames of a video) that have been reconstructed by an image generation network based on compressed frame features i.e., a decoder network of a generative adversarial network (GAN).

The term "edge location" refers to a physical location that is separate from a central location. For example, a site containing a device such as a central server may be a central location, and a site containing an edge device may be an edge location.

The term "neural network" refers to a hardware or software component that includes a number of connected nodes, where signals are passed from one node to another to be processed according to various mathematical algorithms. In some cases, each node of a neural network includes a linear combination of inputs followed by a non-linear activation function.

The term "convolutional neural network" refers to a neural network including nodes that perform convolutional operations on input signals. In an example of a convolution operation, a linear filter is used to convert a window surrounding a pixel to a single value. The window can be passed over successive pixels of an image.

Figure 2:
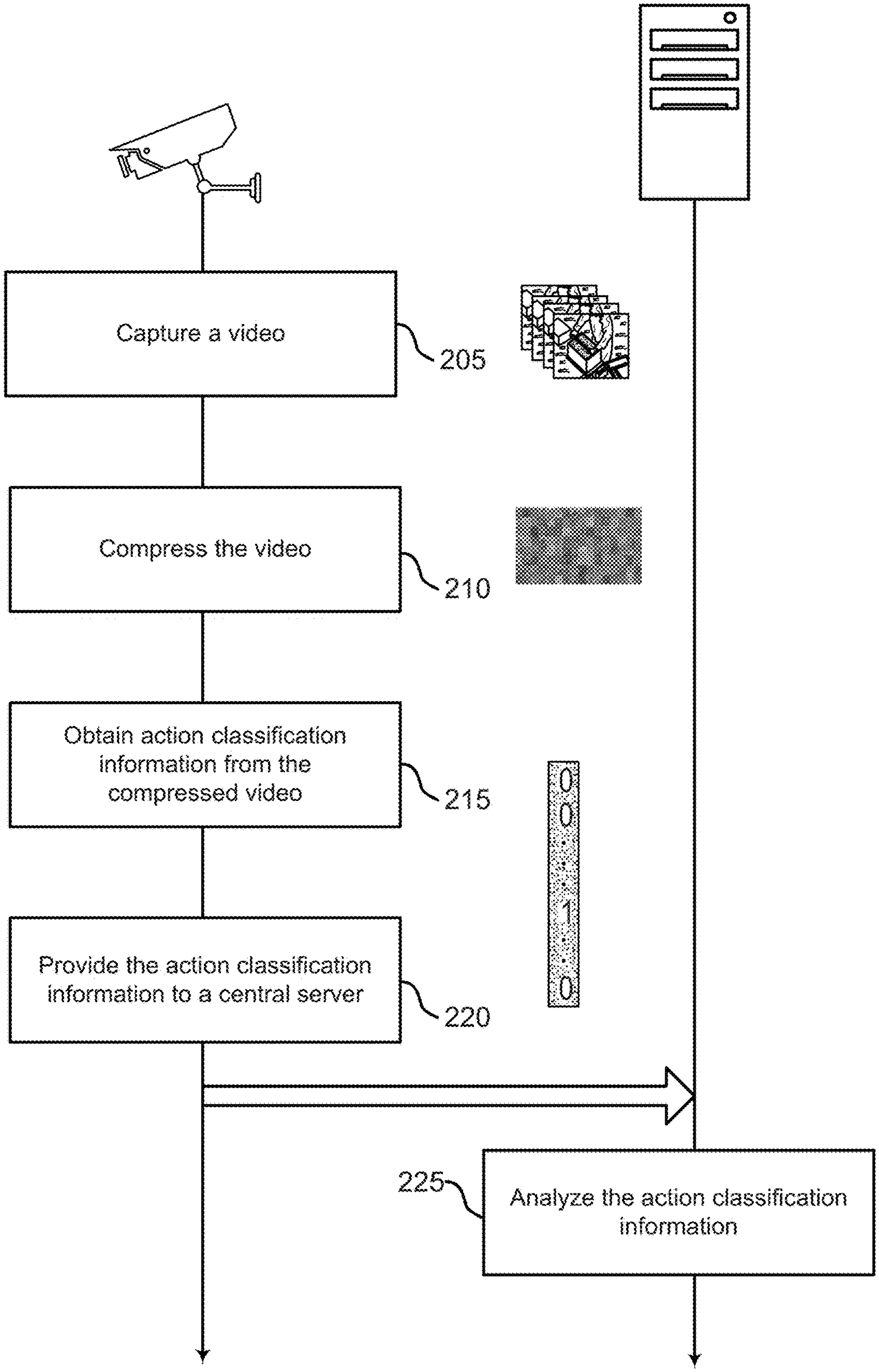
FIG. 2 shows an example of image processing according to aspects of the present disclosure.
Figure 3:
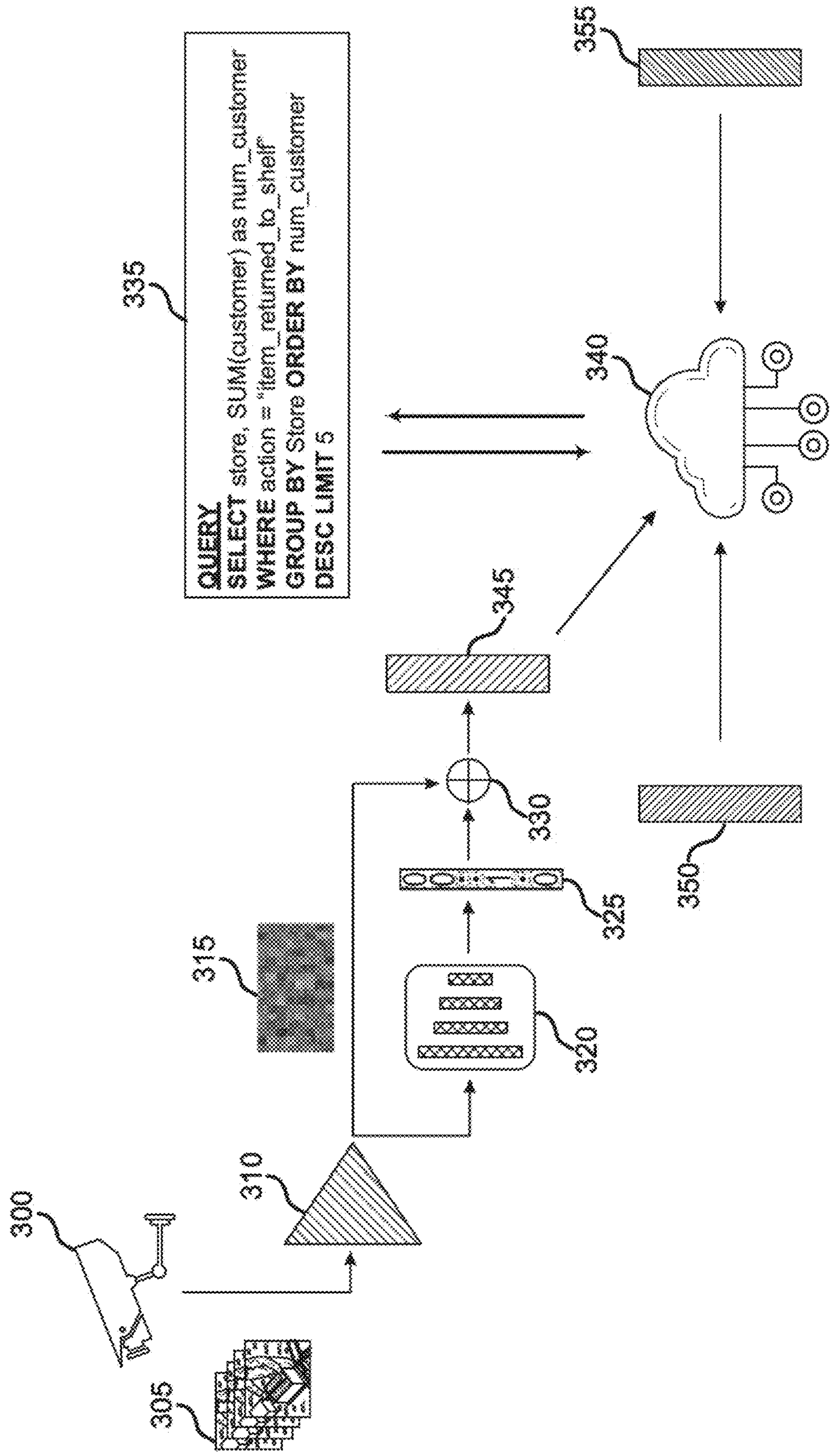
FIG. 3 shows an example of an image processing system according to aspects of the present disclosure.

An example application of the inventive concept in the action recognition context is provided with reference to FIGS. 1-3. Details regarding the architecture of an example machine learning apparatus are provided with reference to FIGS. 4-10. Examples of a process for video analysis are provided with reference to FIGS. 11-16. Examples of a process for training a machine learning model are provided with reference to FIG. 17.

Image Processing System

FIG. 1 shows an example of an image processing system according to aspects of the present disclosure. The example shown includes central server 100, cloud 105, database 110, and edge device 115.

An edge device 115 may communicate with central server 100 via cloud 105. Edge device 115 may capture a video, compress the video, and perform a classification process on the compressed video to obtain action classification information corresponding to an action recorded in the video. Edge device 115 may then send the action classification information to central server 100 via cloud 105. Database 110 may be used to store any and all information transmitted through cloud 105, such as the video, the compressed video, and/or the action classification information.

A server such as central server 100 provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus. Central server 100 is an example of, or includes aspects of, the corresponding element described with reference to FIG. 2.

A cloud such as cloud 105 is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, cloud 105 includes a multi-layer communications network comprising multiple edge routers and core routers. In another example, cloud 105 is based on a local collection of switches in a single physical location. Cloud 105 is an example of, or includes aspects of, the corresponding element described with reference to FIG. 3.

A database such as database 110 is an organized collection of data. For example, database 110 stores data in a specified format known as a schema. Database 110 may be structured as a single database, a distributed database, multiple distributed databases, or an emergency backup database. In some cases, a database controller may manage data storage and processing in database 110. In some cases, a user interacts with the database controller. In other cases, the database controller may operate automatically without user interaction.

As used herein, the term "edge device" refers to a device that is physically located apart from a central device, such as central server 100. For example, central server 100 may be located in a first location such as a data center, and edge device 115 may be located in a different second location, such as a retail store. According to some aspects, edge device 115 includes a camera to record video data. According to some aspects, edge device 115 includes a machine learning model including one or more neural networks to compress the video data and classify the compressed video data to obtain action classification information. In some embodiments, edge device 115 may provide the action classification information, the video data, and/or the compressed video data to central server 100, database 110, and/or a second edge device according to embodiments of the inventive concept via cloud 105.

In some cases, edge device 115 may be implemented on a server similar to central server 100. Edge device 115 is an example of, or includes aspects of, the corresponding element described with reference to FIGS. 2-4.

Referring to FIG. 2, a system may include a central server and an edge device. The edge device may be used to capture video, compress the video, classify an action recorded in the video, and provide action classification information obtained from the classification to the central server for analysis. In this manner, by classifying compressed video at the edge device, the system may avoid transmitting a large amount of raw video data to the central server for classification, thereby using a reduced amount of bandwidth and computational resources.

At operation 205, the system captures a video to obtain a plurality of frames. In some cases, the operations of this step refer to, or may be performed by, an edge device as described with reference to FIGS. 1-4. For example, the device may capture the video via a camera included in the edge device, and the video may include a plurality of frames that depict an action, such as movement of a person or people.

At operation 210, the system compresses the video to obtain compressed frame features. In some cases, the operations of this step refer to, or may be performed by, edge device as described with reference to FIGS. 1-4. For example, the edge device may use a machine learning model included in the edge device to compress the video. In some embodiments, the compressed frame features may depict the action and may include fewer data bits than the plurality of frames. In some embodiments, the edge device may compress the video as described with reference to FIGS. 4-5.

At operation 215, the system obtains action classification information from the compressed video. In some cases, the operations of this step refer to, or may be performed by, an edge device as described with reference to FIGS. 1-4. For example, the edge device may use the machine learning model to classify the compressed frame features to obtain the action classification information. In some embodiments, the action classification information may relate to the action captured in the video (e.g., be a data representation of the action), such as movement of a person or people. In some embodiments, the edge device may obtain the action classification information as described with reference to FIGS. 5-10.

At operation 220, the system provides the action classification information to a central server. In some cases, the operations of this step refer to, or may be performed by, an edge device as described with reference to FIGS. 1-4. For example, the edge device may provide the action classification information to the central server via a cloud as described with reference to FIGS. 1 and 3.

At operation 225, the system analyzes the action classification information. In some cases, the operations of this step refer to, or may be performed by, a central server as described with reference to FIGS. 1 and 2. For example, the central server may analyze the action classification information to determine the action captured by the video, such as movement of a person or people. Information obtained from this analysis may be provided to a database to be stored and aggregated as described with reference to FIG. 1 for storage. An end user may then query the information obtained from the analysis to gain insights into behavior depicted in the collected video data.

FIG. 3 shows an example of an image processing system according to aspects of the present disclosure. The example shown includes camera 300, plurality of frames 305, encoder network 310, compressed frame features 315, classification network 320, action classification information 325, aggregate features 330, query 335, cloud 340, first location 345, second location 350, and third location 355. Camera 300, encoder network 310, and classification network 320 may be included in a machine learning apparatus as described with reference to FIGS. 1-2.

Referring to FIG. 3, camera 300 captures a video including plurality of frames 305. The video may depict an action that spans the plurality of frames 305. The machine learning apparatus provides the plurality of frames 305 to encoder network 310, which compresses each frame of the plurality of frames 305 to obtain compressed frame features 315. Compressed frame features 315 may include fewer data bits than the plurality of frames 305. The machine learning apparatus provides compressed frame features 315 to classification network 320, which classifies compressed frame features 315 to obtain action classification information 325. Action classification information 325 may be a data representation of the action depicted in the video and may correspond to the action depicted in the video.

In some embodiments, the machine learning apparatus may output aggregate features 330. Aggregate features 330 may include compressed frame features 315 and action classification information 325. The machine learning apparatus may be physically located at first location 345, and the first location may be an edge location in a network that includes additional locations (such as second location 350, third location 355, a central location that includes a central server, etc.) connected to each other via cloud 340. First location 345 may communicate with the additional locations via cloud 340, and may provide information such as aggregate features 330, plurality of frames 305, compressed frame features 315, and/or action classification information 325 to the additional locations. A user at an additional location may provide a query 335 to cloud 340 to analyze data and information that has been communicated and/or stored in locations associated with cloud 340.

Camera 300 is an example of, or includes aspects of, the corresponding element described with reference to FIGS. 1 and 2. Plurality of frames 305 are an example of, or includes aspects of, the corresponding element described with reference to FIG. 9. Encoder network 310 is an example of, or includes aspects of, the corresponding element described with reference to FIGS. 4, 5, 12, and 13. Compressed frame features 315 are an example of, or includes aspects of, the corresponding element described with reference to FIGS. 5-7, 9, 12, 13, and 15. Classification network 320 is an example of, or includes aspects of, the corresponding element described with reference to FIGS. 4 and 5. Action classification information 325 is an example of, or includes aspects of, the corresponding element described with reference to FIGS. 5-9, 11, and 15. Cloud 340 is an example of, or includes aspects of, the corresponding element described with reference to FIGS. 1-2.

System Architecture

An apparatus for video analysis is described. One or more aspects of the apparatus include an encoder network configured to compress each frame of a plurality frames of a video to obtain compressed frame features and a classification network configured to classify the compressed frame features to obtain action classification information for an action in the video that spans the plurality of frames of the video.

Some examples of the apparatus further include a camera configured to capture the video. Some examples of the apparatus further include a reporting component configured to report the classification information to a central server. Some examples of the apparatus further include a decoder network configured generate a reconstructed video based on the compressed frame features.

In some aspects, the classification network comprises a three-dimensional convolution layer and a fully connected layer. In some aspects, the classification network comprises a two-dimensional convolution layer. In some aspects, the classification network comprises a convolution component and a recurrent neural network. In some aspects, the classification network comprises an attention layer.

Figure 4:
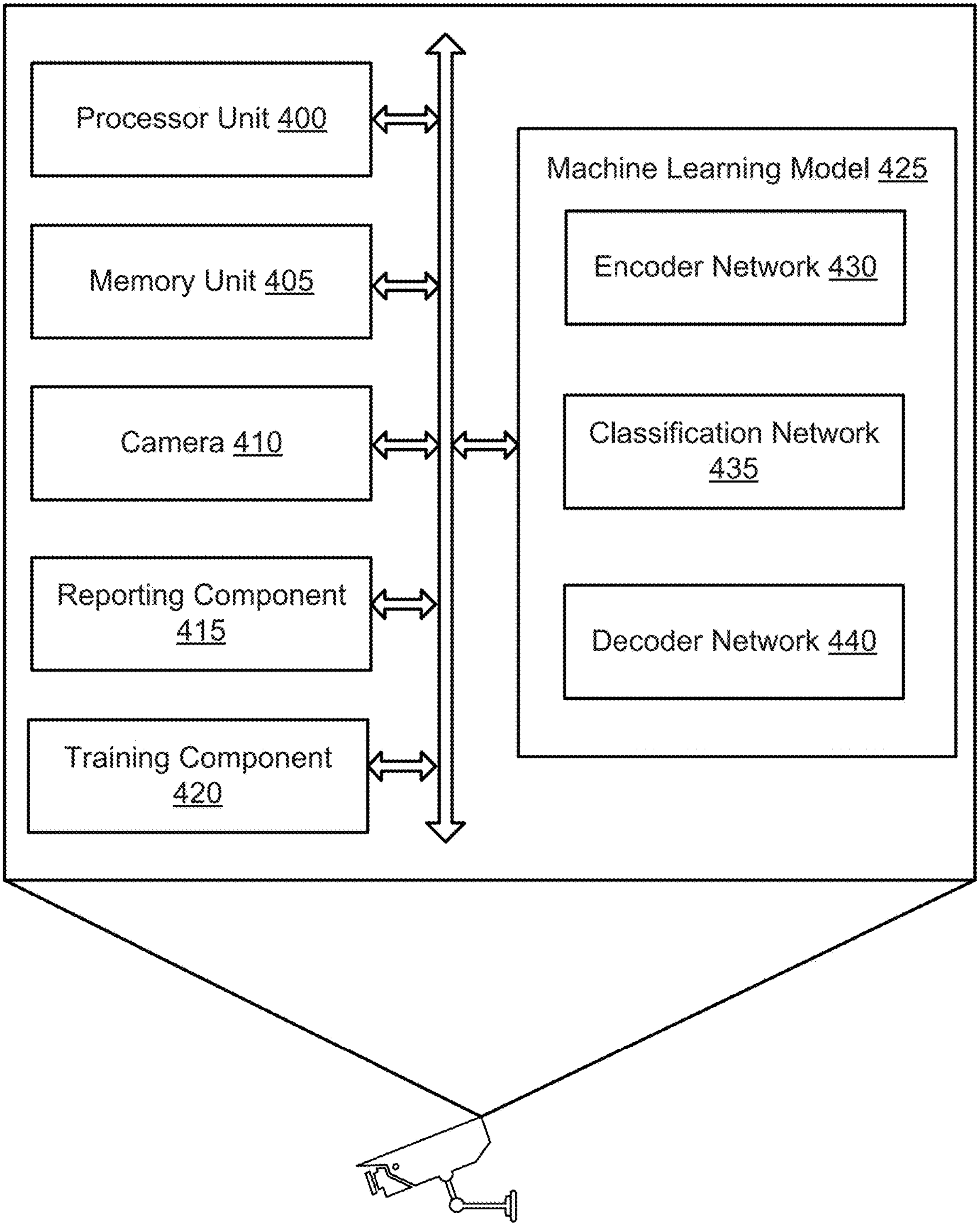
FIG. 4 shows an example of a machine learning apparatus according to aspects of the present disclosure.

FIG. 4 shows an example of a machine learning apparatus according to aspects of the present disclosure. The example shown includes processor unit 400, memory unit 405, camera 410, reporting component 415, training component 420, and machine learning model 425. In some embodiments, training component 420 may be included in a different device than the machine learning apparatus. For example, training component 420 may be included in a server such as the central server described with reference to FIGS. 1-2.

Processor unit 400 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 400 is configured to operate a memory array using a memory controller. In other cases, a memory controller is integrated into processor unit 400. In some cases, processor unit 400 is configured to execute computer-readable instructions stored in memory unit 405 to perform various functions. In some embodiments, processor unit 400 includes special purpose components for modem processing, baseband processing, digital signal processing, or transmission processing.

Memory unit 405 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 400 to perform various functions described herein. In some cases, memory unit 405 contains, among other things, a basic input/output system (BIOS) which controls basic hardware or software operation such as the interaction with peripheral components or devices. In some cases, memory unit 405 includes a memory controller that operates memory cells of memory unit 405. For example, the memory controller may include a row decoder, column decoder, or both. In some cases, memory cells within memory unit 405 store information in the form of a logical state.

According to some aspects, camera 410 is configured to capture the video. For example, camera 410 may be an optical instrument for recording or capturing images that may be stored locally, transmitted to another location, etc. For example, camera 410 may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal.

According to some aspects, reporting component 415 transmits action classification information to a central server. According to some aspects, reporting component 415 is configured to report the classification information to a central server.

Machine learning model 425 may include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In one aspect, machine learning model 425 includes encoder network 430, classification network 435, and decoder network 465. Each of encoder network 430, classification network 435, and decoder network 465 may include one or more ANNs.

According to some aspects, encoder network 430 is configured to compress each frame of a plurality frames of a video to obtain compressed frame features. According to some aspects, encoder network 430 receives a set of frames of a video, where the video depicts an action that spans the set of frames. In some examples, encoder network 430 compresses each frame of the set of frames to obtain compressed frame features, where the compressed frame features include fewer data bits than then the set of frames of the video. In some examples, encoder network 430 compresses each frame of a first subset of the set of frames by iteratively encoding and reconstructing the frame to obtain first compressed frame features. In some examples, encoder network 430 compresses each frame of a second subset of the set of frames by interpolating from the first compressed frame features to obtain second compressed frame features, where the compressed frame features include the first compressed frame features and the second compressed frame features. In some aspects, the compressed frame features include a binary code. In some aspects, a compression ratio of the compressed frame features is at least 2.

According to some aspects, encoder network 430 compresses frames of a training video using an encoder network 430 to obtain compressed frame features. In some examples, encoder network 430 compresses frames of a preliminary training video to obtain preliminary compressed frame features. In some examples, encoder network 430 compresses each frame of a first subset of the set of frames by iteratively encoding and reconstructing the frame to obtain first compressed frame features. In some examples, encoder network 430 compresses each frame of a second subset of the set of frames by interpolating from the first compressed frame features to obtain second compressed frame features, where the compressed frame features include the first compressed frame features and the second compressed frame features.

Encoder network 430 is an example of, or includes aspects of, the corresponding element described with reference to FIGS. 3, 5, and 11-12.

According to some aspects, classification network 435 classifies the compressed frame features to obtain action classification information corresponding to the action in the video. In some examples, classification network 435 decodes the compressed frame features using a three-dimensional convolution network and a fully connected layer, where the action classification information is based on the decoding. In some examples, classification network 435 performs a two-dimensional convolution operation on at least one frame of the video, where the fully connected layer takes an output of the three-dimensional convolution network and an output of the two-dimensional convolution operation as input. In some examples, classification network 435 decodes the compressed frame features using a recurrent neural network, where the action classification information is based on the decoding. In some examples, classification network 435 performs a convolution operation on at least one frame of the video, where a layer of the recurrent neural network takes a hidden state from a previous layer and an output of the convolution operation as input.

According to some aspects, classification network 435 classifies the compressed frame features to obtain action classification information for an action in the video that spans the set of frames of the video. In some examples, classification network 435 decompresses the preliminary compressed frame features to obtain a reconstructed video.

According to some aspects, classification network 435 is configured to classify the compressed frame features to obtain action classification information for an action in the video that spans the plurality of frames of the video. In some aspects, the classification network 435 includes a three-dimensional convolution layer and a fully connected layer. In some aspects, the classification network 435 includes a two-dimensional convolution layer. In some aspects, the classification network 435 includes a convolution component and a recurrent neural network. In some aspects, the classification network 435 includes an attention layer.

Classification network 435 is an example of, or includes aspects of, the corresponding element described with reference to FIGS. 3 and 5-10.

According to some aspects, decoder network 465 is configured to generate a reconstructed video based on the compressed frame features. Decoder network 465 is an example of, or includes aspects of, the corresponding element described with reference to FIGS. 5 and 11-13.

According to some aspects, training component 420 updates parameters of a classification network 435 by comparing the action classification information to ground truth action classification information. In some examples, training component 420 updates parameters of an encoder network 430 by comparing the preliminary training video and the reconstructed video.

Figure 5:
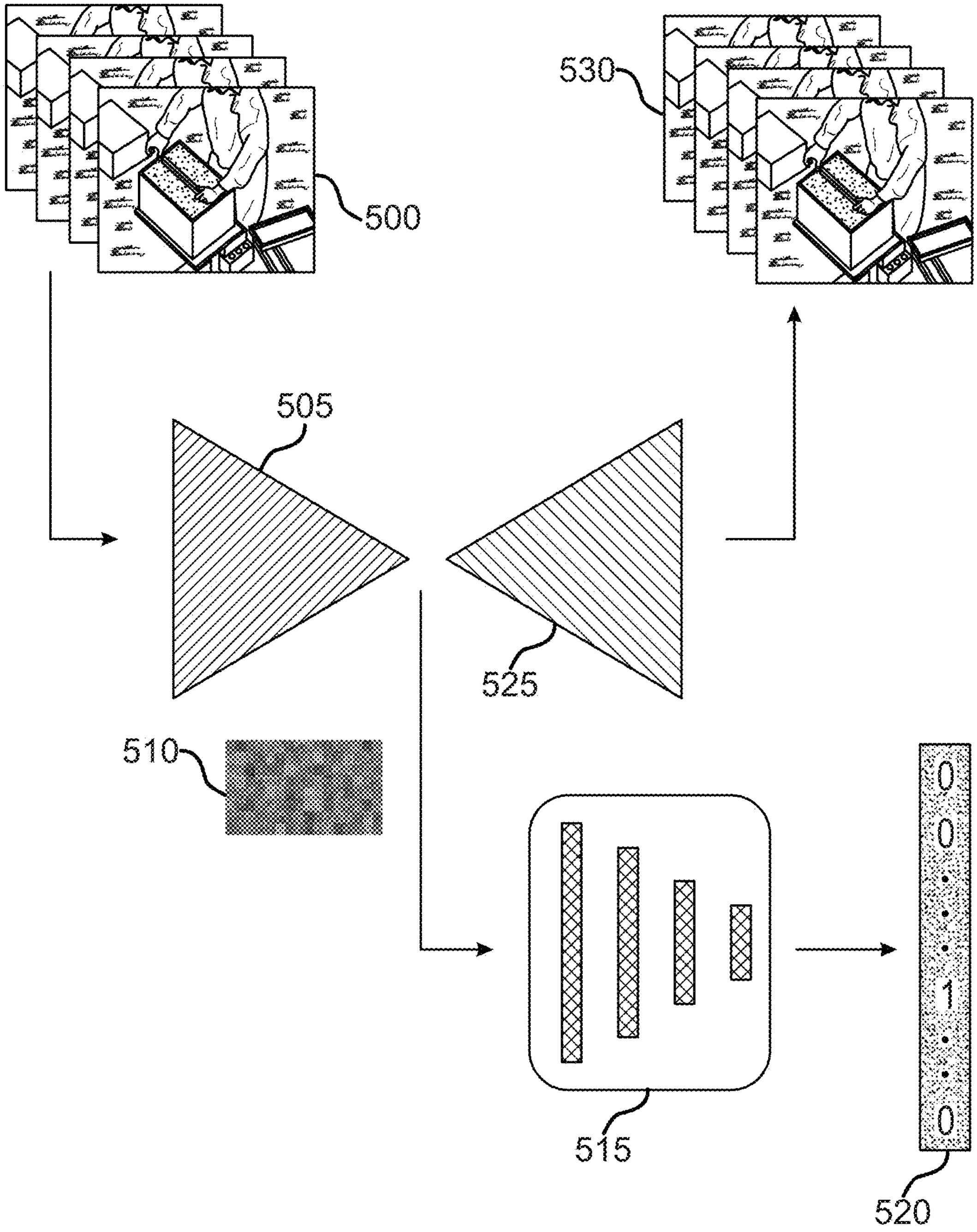
FIG. 5 shows an example of a classification network according to aspects of the present disclosure.

FIG. 5 shows an example of a classification network according to aspects of the present disclosure. The example shown includes plurality of frames 500, encoder network 505, compressed frame features 510, classification network 515, action classification information 520, decoder network 525, and reconstructed video 530.

According to one embodiment, the decoder network 525 is used only during training to ensure that the encoder network can both compress and encode features of a video. For example, encoder network 505 can encode frames of a video using fewer bits than the frames themselves, and then decoder can attempt to reconstruct the video. The video can then be compared with the reconstructed video, and a loss function can be used that encourages the compressed frames to contain as much information as possible for reconstructing the video. Thus, a machine learning model may be used to learn the most effective method of compressing the video using the encoder network 505.

Referring to FIG. 5, $I^{(t)} \in R^{W \times H \times 3}$ may denote plurality of frames 500 for times $t \in \{0,1\}^{N_t}$. Encoder network 505 may compress each frame of the plurality of frames into a binary code $b^{(t)} \in \{0,1\}^{N_t}$ (e.g., compressed frame features 510). Encoder network 505 and decoder network 525 respectively compress and decompress the video, while at the same time minimizing the total bitrate.

Each of encoder network 505 and decoder network 525 may include a convolutional-LSTM network. The convolutional-LSTM network may include at least one convolutional neural network (CNN). A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In one aspect, classification network 515 includes a recurrent neural network (RNN). For example, the convolutional-LSTM network may also include at least one LSTM network. Long short-term memory (LSTM) is a form of RNN that includes feedback connections. An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

In one example, an LSTM network includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTM networks can help mitigate vanishing gradients and exploding gradients when training an RNN. In the convolutional-LSTM network, an input to each LSTM cell is a hidden state of a previous layer and an output of a convolution network for each feature map (reduced embedding).

In an embodiment, each of encoder network 505 and decoder network 525 may include four convolution-LSTM states. In an embodiment, each state of encoder network 505 and decoder network 525 may have a stride length of two. As used herein, "stride length" refers to the length of an output of a convolution-LSTM network, where a stride length of two means that an output of the convolution-LSTM network is approximately half the length of an input to the convolution-LSTM network. In an embodiment, encoder network 505 may include three convolution-LSTM states.

Encoder network 505 may receive the plurality of frames 500 as input and output compressed frame features 510. Classification network 515 may classify compressed frame features 510 to output action classification information 520. Decoder network 525 may decompress compressed frame features 510 to output reconstructed video 530.

Plurality of frames 500 is an example of, or includes aspects of, the corresponding element described with reference to FIGS. 1-3. Encoder network 505 is an example of, or includes aspects of, the corresponding element described with reference to FIGS. 3, 4, 12, and 13. Compressed frame features 510 are an example of, or includes aspects of, the corresponding element described with reference to FIGS. 1-3, 6, 7, 9, 12, 13, and 15. Classification network 515 is an example of, or includes aspects of, the corresponding element described with reference to FIGS. 3 and 4. Action classification information 520 is an example of, or includes aspects of, the corresponding element described with reference to FIGS. 3, 6-10, and 15. Decoder network 525 is an example of, or includes aspects of, the corresponding element described with reference to FIGS. 4, and 11-13. Reconstructed video 530 are an example of, or includes aspects of, the corresponding element described with reference to FIGS. 12 and 13.

Figure 6:
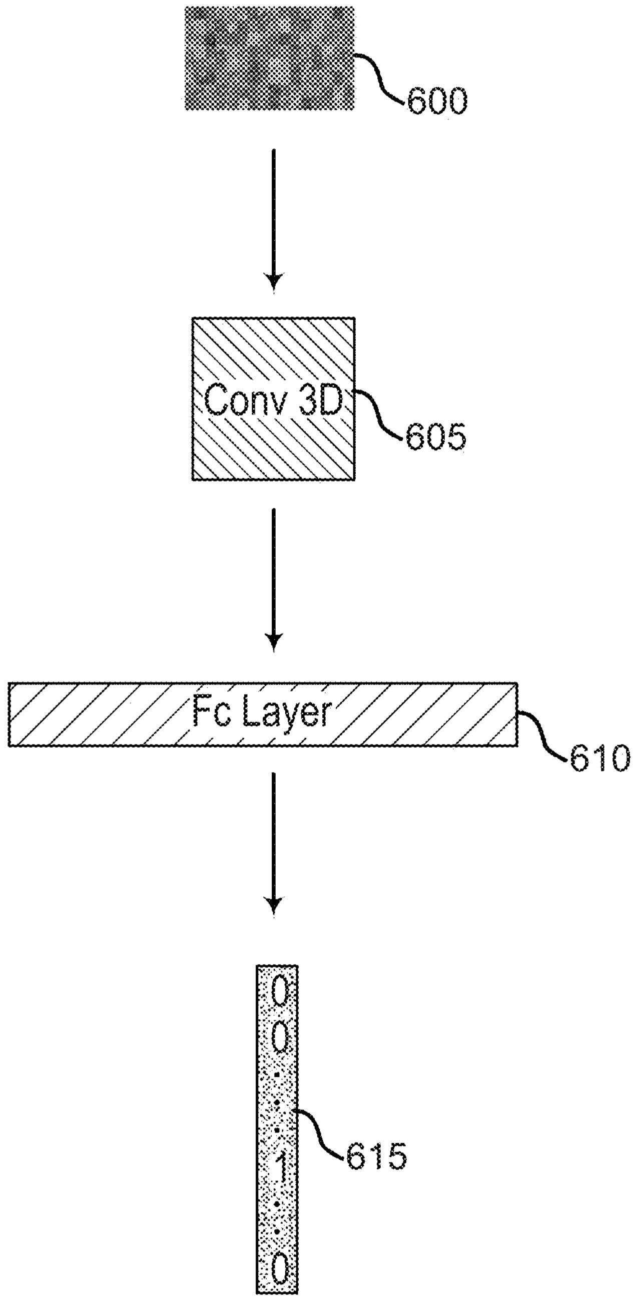
FIG. 6 shows an example of three-dimensional convolution according to aspects of the present disclosure.

FIG. 6 shows an example of three-dimensional convolution according to aspects of the present disclosure. The example shown includes compressed frame features 600, three-dimensional convolution network 605, at least one fully connected layer 610, and action classification information 615.

Referring to FIG. 6, a classification network as described with reference to FIGS. 4-5 includes three-dimensional convolution network 605 and at least one fully connected layer 610. In some embodiments, three-dimensional convolution network 605 may be a deep three-dimensional CNN that includes a homogenous architecture containing 3×3×3 convolutional kernels followed by 2×2×2 pooling (downsampling) at each layer of three-dimensional convolution network 605. Three-dimensional convolution network 605 may extract both spatial and temporal components relating to the motion of objects, human actions, human-scene or human-object interaction, and appearance of those objects, humans, and scenes from compressed frame features 600.

In some embodiments, three-dimensional convolution network 605 may include three layers that perform of convolution operations, pooling operations, and rectified linear activation (ReLU) operations. A ReLU function is piecewise linear function that will directly output its input if the input is positive and will output zero if the input is not positive.

At least one fully connected layer 610 may take an output of three-dimensional convolution network 605 to output action classification information 615 as a softmax classification score. For example, at least one fully connected layer 610 may be a classification layer. A fully connected layer applies a linear transformation to an input vector using a weights matrix, and then applies a non-linear transformation to a dot product of the weights matrix and the input vector. A bias term may be added to the dot product. The non-linear transformation function outputs a vector. A softmax function is used as the activation function of a neural network to normalize the output of the network to a probability distribution over predicted output classes. After applying the softmax function, each component of the feature map is in the interval (0, 1) and the components add up to one. These values are interpreted as probabilities. For example, action classification information 615 may be a numerical prediction of the likelihood that the video depicts a given action.

As three-dimensional convolution network 605 takes a fixed dimensional input, compressed frame features 600 may be divided into n segments, with each segment corresponding to a frame of the plurality of frames, and action classification information 615 may be calculated as an average value over the n segments.

In some embodiments, three-dimensional convolution network 605 may include three fully connected layers, and the three fully connected layers may output action classification information 615.

Compressed frame features 600 are an example of, or includes aspects of, the corresponding element described with reference to FIGS. 3, 5, 7, 9, 11-13, and 15. Three-dimensional convolution network 605 is an example of, or includes aspects of, the corresponding element described with reference to FIGS. 4, 7, and 9. At least one fully connected layer 610 is an example of, or includes aspects of, the corresponding element described with reference to FIGS. 4, and 7-10. Action classification information 615 is an example of, or includes aspects of, the corresponding element described with reference to FIGS. 3, 5, 7-10, and 15.

Figure 7:
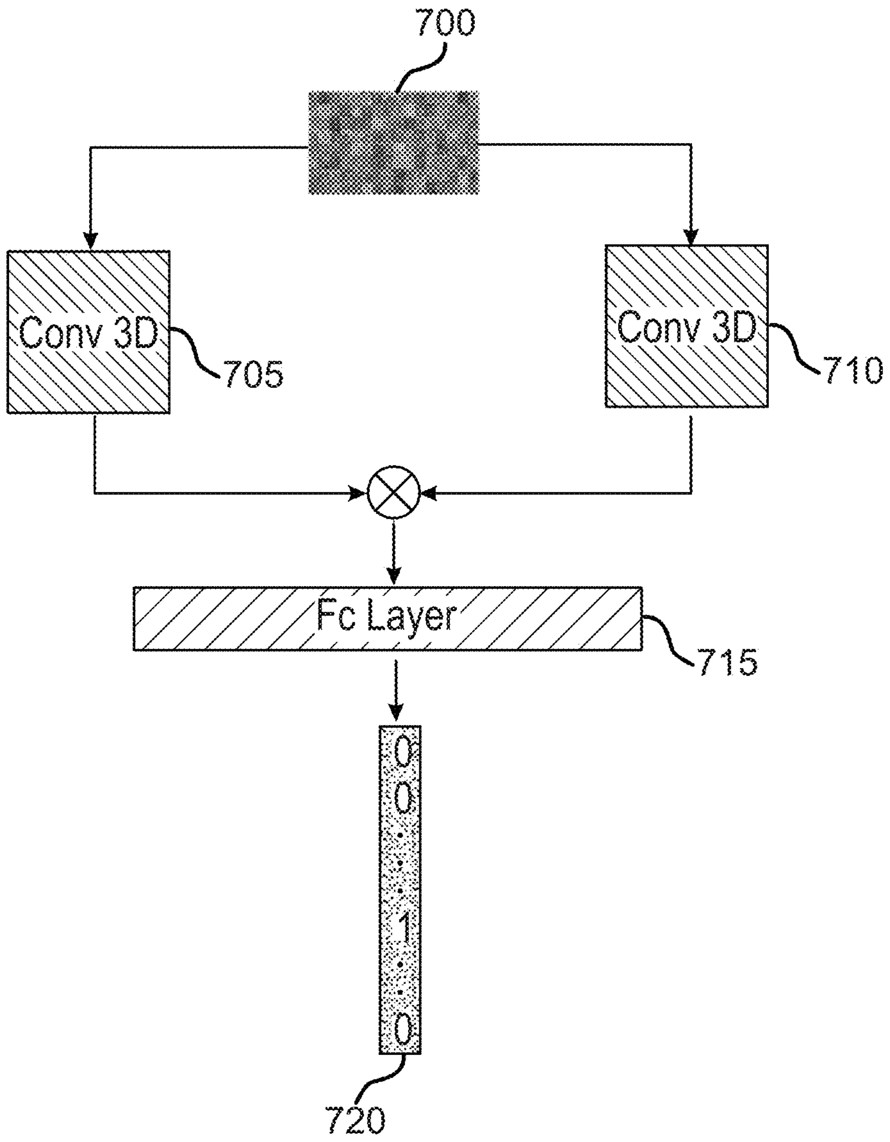
FIG. 7 shows an example of bilinear three-dimensional convolution according to aspects of the present disclosure.

FIG. 7 shows an example of bilinear three-dimensional convolution according to aspects of the present disclosure. The example shown includes compressed frame features 700, first three-dimensional convolution network 705, second three-dimensional convolution network 710, at least one fully connected layer 715, and action classification information 720.

Referring to FIG. 7, a classification network as described with reference to FIGS. 4-5 may include first three-dimensional convolution network 705, second three-dimensional convolution network 710, and at least one fully connected layer 715. Each of first three-dimensional convolution network 705 and second three-dimensional convolution network 710 may take compressed frame features 700 as input. The classification network may aggregate the output of each of first three-dimensional convolution network 705 and second three-dimensional convolution network 710 and provide the output to at least one fully connected layer 715 to determine action classification information 720.

Compressed frame features 700 are an example of, or includes aspects of, the corresponding element described with reference to FIGS. 3, 5, 6, 9, 11-13, and 16-17. First three-dimensional convolution network 705 and second three-dimensional convolution network 710 are examples of, or includes aspects of, the three-dimensional convolution network described with reference to FIGS. 4, 6, and 9. At least one fully connected layer 715 is an example of, or includes aspects of, the corresponding element described with reference to FIGS. 4, 6, and 8-10. Action classification information 720 is an example of, or includes aspects of, the corresponding element described with reference to FIGS. 3, 5-6, 8-9, and 15.

Figure 8:
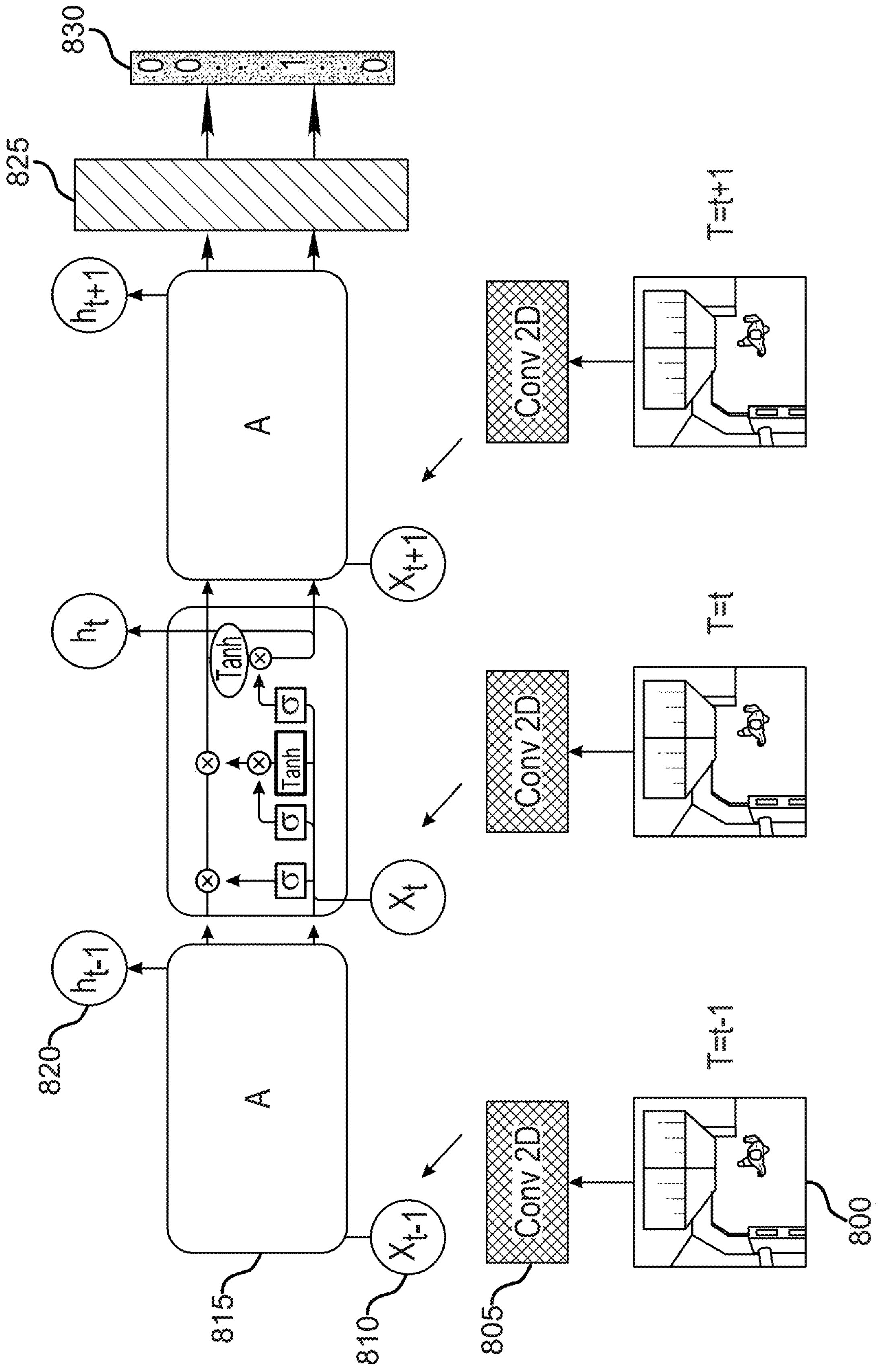
FIG. 8 shows an example of two-dimensional convolution according to aspects of the present disclosure.

FIG. 8 shows an example of two-dimensional convolution according to aspects of the present disclosure. The example shown includes plurality of frames 800, two-dimensional convolution network 805, plurality of outputs 810, LSTM cell 815, plurality of hidden states 820, at least one fully connected layer 825, and action classification information 830.

Referring to FIG. 8, a classification network as described with reference to FIGS. 4-5 may include two-dimensional convolution network 805. Two-dimensional convolution network 805 may receive plurality of frames 800 as input and process the plurality of frames 800 using two layers that perform convolution, pooling, and ReLU functions. As shown in FIG. 8, the plurality of frames 800 includes frames captured at times t−1, t, and t+1. Two-dimensional convolution network 805 may receive plurality of frames 800 and may output corresponding plurality of outputs 810. In an embodiment, the classification network can receive compressed frame features according to the present disclosure as inputs.

The classification network may include LSTM cell 815. In some embodiments, LSTM cell 815 generates hidden representations that are used to generate action classification information (such as action classification information 870). As shown in FIG. 8, LSTM cell 815 includes three sigmoid layers and a tanh layer. At each loop of an LSTM process, LSTM cell 815 receives an input, passes the input through the four layers, and decides whether to keep an output of a previous LSTM loop as part of the output of the current loop. Each block of LSTM cell 815 shown in FIG. 8 represents a loop of the LSTM process, and LSTM cell 815 may iteratively loop with the plurality of outputs 810 as an input at each loop, and a previous cell state of a previous loop as another input. LSTM cell 815 outputs a final hidden representation at the end of the looping LSTM process and provides the hidden representation to at least one fully connected layer 825. In some embodiments, as there are no temporal dimension restrictions, an entire video may be classified at once in this manner.

In some aspects, the classification network comprises an attention layer. For example, a bidirectional attention mechanism may be included in or after LSTM cell 815. In the machine learning field, an attention mechanism is a method of placing differing levels of importance on different elements of an input. Calculating attention may involve three basic steps. First, a similarity between query and key vectors obtained from an input is computed to generate attention weights. Similarity functions used for this process can include dot product, splice, detector, and the like. Next, a softmax function is used to normalize the attention weights. Finally, the attention weights are weighed together with their corresponding values.

Plurality of frames 800 are an example of, or include aspects of, the corresponding element described with reference to FIGS. 1-3. Two-dimensional convolution network 805 is an example of, or includes aspects of, the corresponding element described with reference to FIG. 9. At least one fully connected layer 825 is an example of, or includes aspects of, the corresponding element described with reference to FIGS. 6, 7, 9, and 11. Action classification information 830 is an example of, or includes aspects of, the corresponding element described with reference to FIGS. 3, 5-7, 9, 11, and 15.

Figure 9:
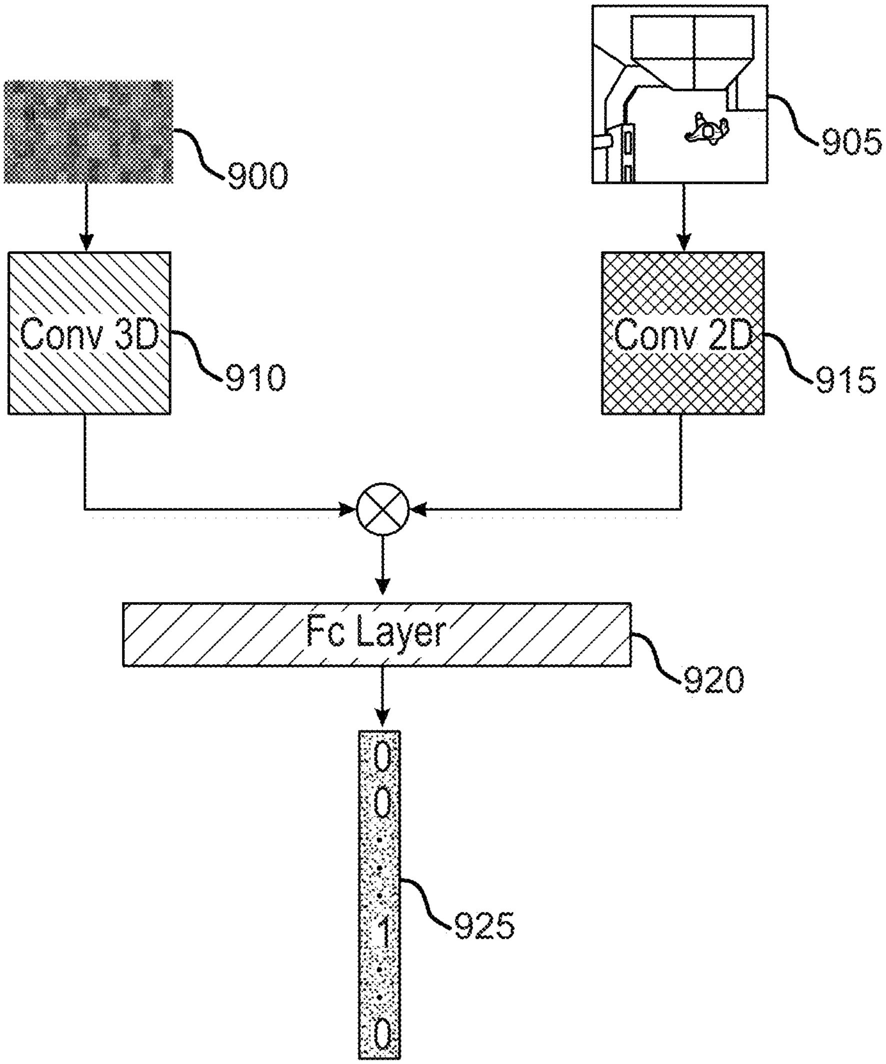
FIG. 9 shows an example of three-dimensional and two-dimensional convolution according to aspects of the present disclosure.

FIG. 9 shows an example of three-dimensional and two-dimensional convolution according to aspects of the present disclosure. The example shown includes compressed frame features 900, frame 905, three-dimensional convolution network 910, two-dimensional convolution network 915, at least one fully connected layer 920, and action classification information 925.

Referring to FIG. 9, a classification network as described with reference to FIGS. 4-5 may include three-dimensional convolution network 910, two-dimensional convolution network 915, and at least one fully connected layer 920. Three-dimensional convolution network 910 may take compressed frame features 900 as input, and two-dimensional convolution network 915 may take frame 905 as input. In some embodiments, frame 905 may be a frame that is randomly sampled from the plurality of frames of the video. Two-dimensional convolution network 915 may output a feature vector corresponding to the randomly sampled frame that may allow the classification network to better understand color and object information included in the video. In some embodiments, two-dimensional convolution network 915 can receive compressed frame features 900 as input. The classification network may concatenate outputs of three-dimensional convolution network 910 and two-dimensional convolution network 915 and provide the outputs to at least one fully connected layer 920 to output action classification information 925. The use of two-dimensional convolution network 915 may increase color and object understanding of the classification network.

Compressed frame features 900 are an example of, or includes aspects of, the corresponding element described with reference to FIGS. 3, 5-7, 12-13, and 16-17. Three-dimensional convolution network 910 is an example of, or includes aspects of, the corresponding element described with reference to FIGS. 6-7. Two-dimensional convolution network 915 is an example of, or includes aspects of, the corresponding element described with reference to FIG. 8. At least one fully connected layer 920 is an example of, or includes aspects of, the corresponding element described with reference to FIGS. 6-8 and 10. Action classification information 925 is an example of, or includes aspects of, the corresponding element described with reference to FIGS. 3, 5-8, 10, and 15.

Figure 10:
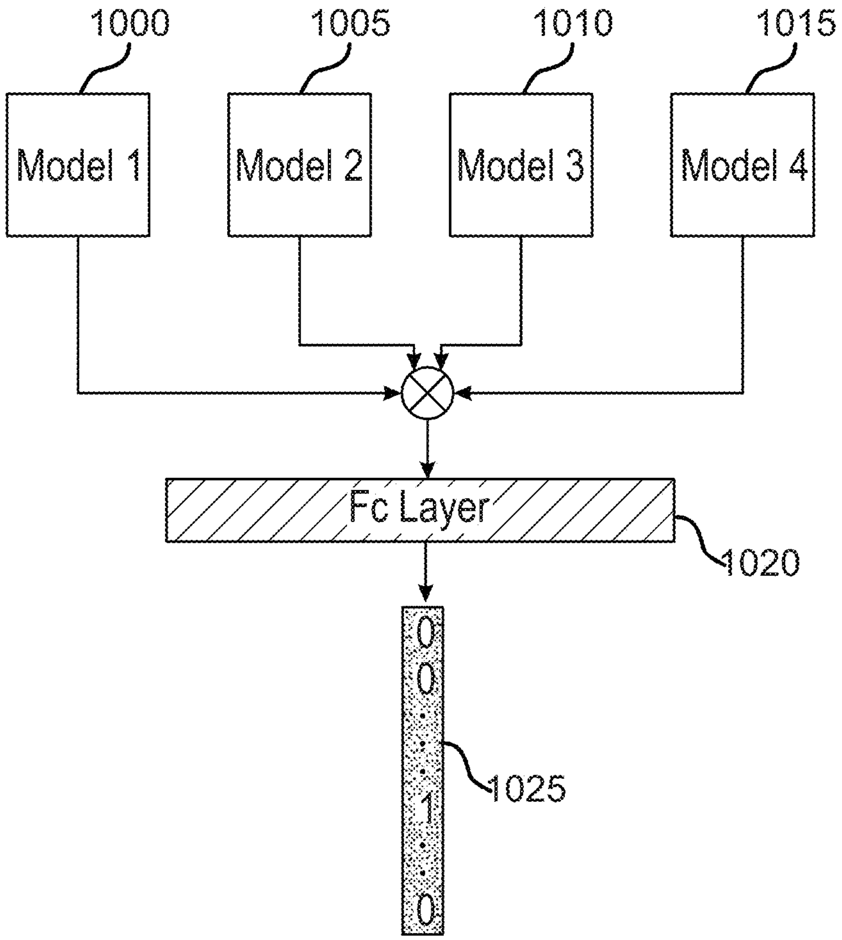
FIG. 10 shows an example of multi-model action classification according to aspects of the present disclosure.

FIG. 10 shows an example of action classification according to aspects of the present disclosure. The example shown includes first model 1000, second model 1005, third model 1010, fourth model 1015, at least one fully connected layer 1020, and action classification information 1025.

Referring to FIG. 10, each of first model 1000, second model 1005, third model 1010, and fourth model 1015 may be a model employed by one or more neural networks as described by the present disclosure. For example, first model 1000 may include a three-dimensional convolutional network, second model 1005 may include a three-dimensional convolution network and a two-dimensional convolution network, third model 1010 may include two three-dimensional convolution networks, and fourth model 1015 may include one or more convolution-LSTM networks. Outputs of each of first model 1000, second model 1005, third model 1010, and fourth model 1015 may be concatenated and provided to at least one fully connected layer 1020 to output action classification information 1025.

Although four models are shown in FIG. 10, embodiments of the present disclosure may use less than four models or more than four models to provide outputs to at least one fully connected layer 1020. Configurations of each of the models may be variously changed according to embodiments of the present disclosure.

At least one fully connected layer 1020 is an example of, or includes aspects of, the corresponding element described with reference to FIGS. 5-7 and 9. Action classification information 1125 is an example of, or includes aspects of, the corresponding element described with reference to FIGS. 3, 5-9, and 15.

Video Processing

A method for video analysis is described. One or more aspects of the method include receiving a plurality of frames of a video, wherein the video depicts an action that spans the plurality of frames; compressing each of the plurality frames to obtain compressed frame features, wherein the compressed frame features include fewer data bits than then plurality of frames of the video; and classifying the compressed frame features to obtain action classification information corresponding to the action in the video.

Some examples of the method further include recording the video at an edge device, wherein the classification is performed at the edge device. Some examples further include transmitting the action classification information to a central server.

Some examples of the method further include compressing each frame of a first subset of the plurality of frames by iteratively encoding and reconstructing the frame to obtain first compressed frame features. Some examples further include compressing each frame of a second subset of the plurality frames by interpolating from the first compressed frame features to obtain second compressed frame features, wherein the compressed frame features include the first compressed frame features and the second compressed frame features.

Some examples of the method further include decoding the compressed frame features using a three-dimensional convolution network and a fully connected layer, wherein the action classification information is based on the decoding. Some examples of the method further include performing a two-dimensional convolution operation on at least one frame of the video, wherein the fully connected layer takes an output of the three-dimensional convolution network and an output of the two-dimensional convolution operation as input.

Some examples of the method further include decoding the compressed frame features using a recurrent neural network, wherein the action classification information is based on the decoding. Some examples of the method further include performing a convolution operation on at least one frame of the video, wherein a layer of the recurrent neural network takes a hidden state from a previous layer and an output of the convolution operation as input.

In some aspects, the compressed frame features comprise a binary code. In some aspects, a compression ratio of the compressed frame features is at least 2.

Figure 11:
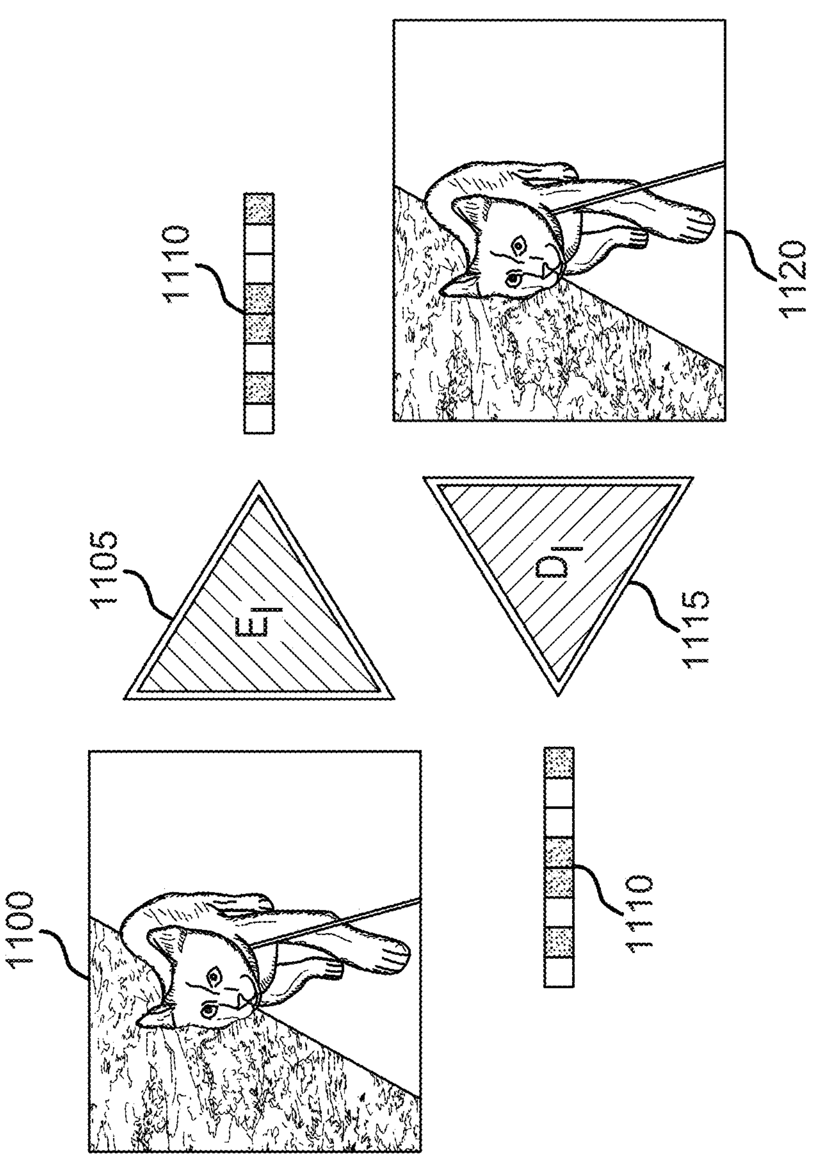
FIG. 11 shows an example of iterative compression and decompression according to aspects of the present disclosure.
Figure 12:
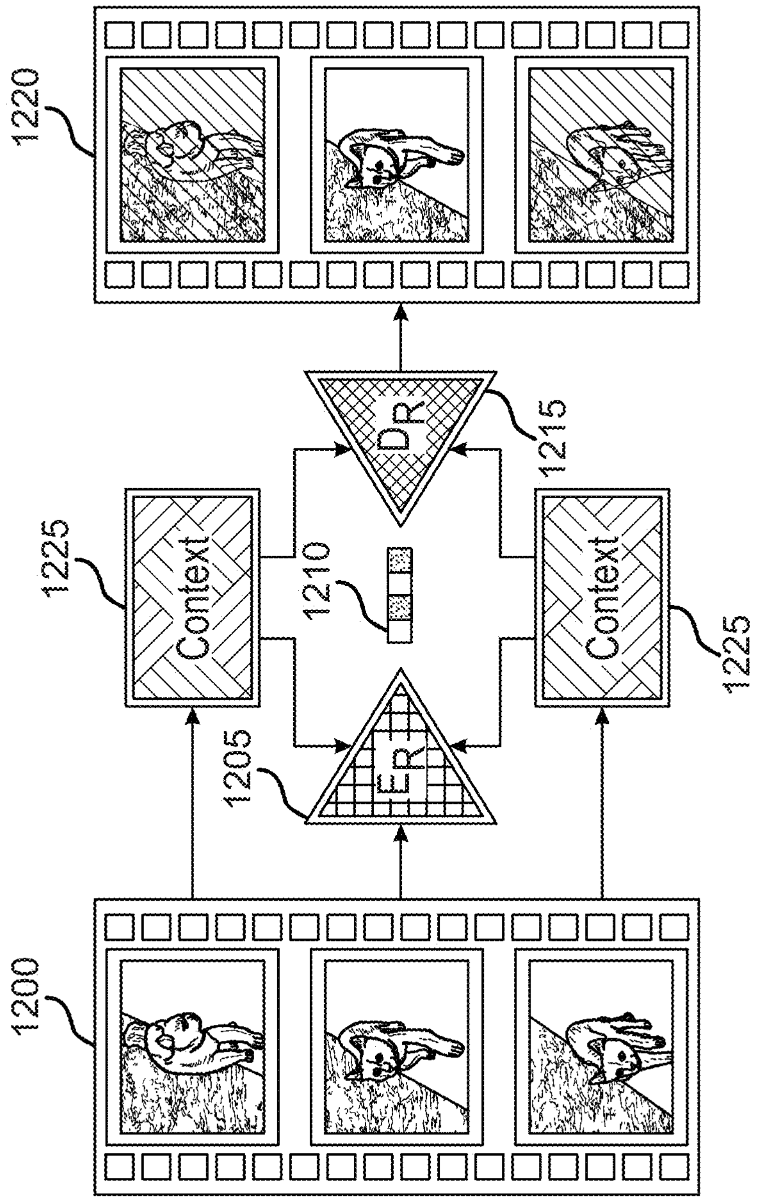
FIG. 12 shows an example of compression using frame interpolation according to aspects of the present disclosure.
Figure 13:
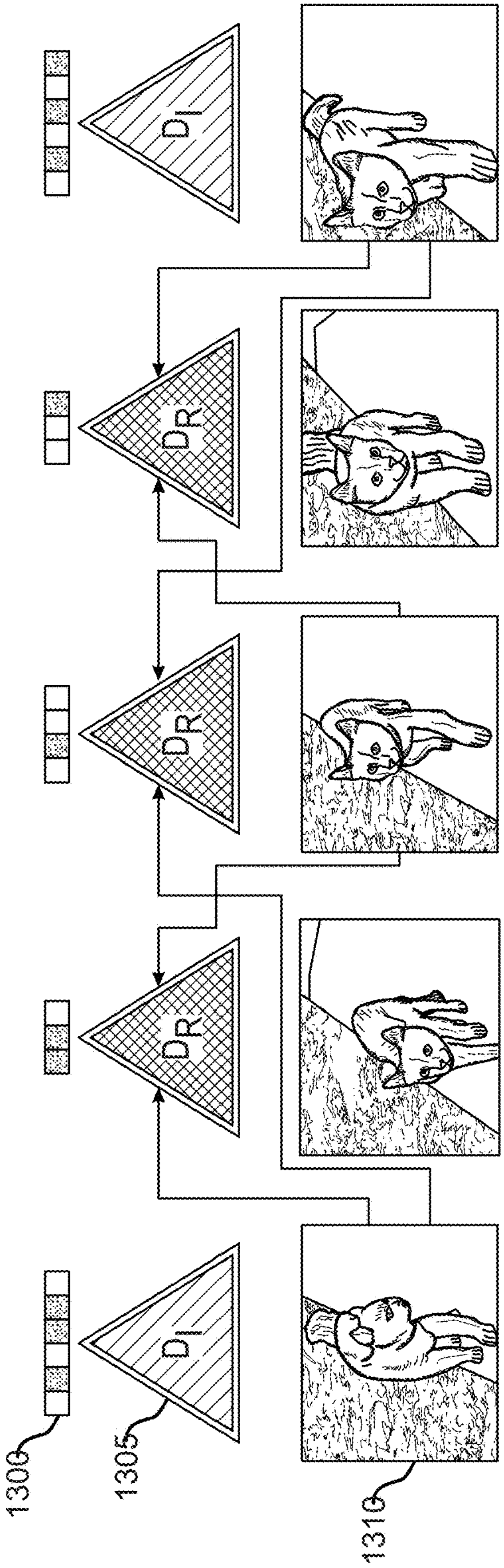
FIG. 13 shows an example of hierarchical interpolation.

FIG. 11 shows an example of iterative compression and decompression according to aspects of the present disclosure, FIG. 12 shows an example of compression using frame interpolation according to aspects of the present disclosure, and FIG. 13 shows an example of hierarchical interpolation according to aspects of the present disclosure.

The example shown in FIG. 11 includes I-frames 1100, encoder network 1105, compressed frame features 1110, decoder network 1115, and reconstructed video 1120. Referring to FIG. 11, encoder network 1105 compresses each frame of a first subset of a set of frames (e.g., I-frames 1100) by iteratively encoding and reconstructing the frame via decoder network 1115 to obtain first compressed frame features 1110. In some examples, encoder network 1105 compresses frames of a preliminary training video to obtain preliminary compressed frame features. In some examples, encoder network 1105 compresses each frame of a first subset of a set of frames (e.g., I-frames 1100) by iteratively encoding and reconstructing the frame via decoder network 1115 to obtain first compressed frame features 1110. For example, encoder network 1105 may compress the I-frames 1100 using image compression $E_I: I^t \rightarrow b^{(t)}$, and decoder network 1115 may decompress each compressed frame feature 1110 using image decompression $D_I: b^t \rightarrow \hat{I}^{(t)}$.

Encoder network 1105 and decoder network 1115 respectively encode and reconstruct an image progressively over K iterations. At each iteration, encoder network 1105 encodes a residual $r_k$ between a previously encoded image and the original frame:

$$r_0 = 1 \tag{1}$$

$$b_k = E_I(r_{k-1}, g_{k-1}) \tag{2}$$

$$r_k = r_{k-1} - D_I(b_k, h_{k-1}) \tag{3}$$

for k=1, 2, . . . , where $g_k$ and $h_k$ are latent convolution-LSTM states that may be updated in each iteration. All iterations K share this same recurrent structure. A reconstructed video 1120 may be calculated according to:

$$I_K = \sum_{k=1}^{K} D_I(b_k) \tag{4}$$

in which K allows for a choice of variable bitrate encoding.

Accordingly, reconstructed video 1120 output by decoder network 1115 may be iteratively used as input to encoder network 1105. Both encoder network 1105 and decoder network 1115 may include four convolution-LSTM states. Every n-th frame of the video may be chosen as an I-frame (for example, n may be 12).

The example shown in FIG. 12 includes first subset of frames 1200, encoder network 1205, first compressed frame features 1210, decoder network 1215, second subset of frames 1220, and context network 1225. Referring to FIG. 12, all frames other than those chosen as I-frames 1100 may be referred to as R-frames, and frames 1200 may include I-frames and R-frames. Encoder network 1205 compresses each frame of a second subset of the set of frames 1220 by interpolating from first compressed frame features 1210 to obtain second compressed frame features, where the compressed frame features include first compressed frame features 1210 and the second compressed frame features. In some aspects, the compressed frame features include a binary code.

For example, first subset of frames 1200 may include R-frames and two I-frames (e.g., key-frames), $I_1$ and $I_2$. The R-frames may be interpolated using $I_1$ and $I_2$. In some embodiments, a machine learning apparatus according to the present disclosure may include context network 1225. Context network 1225 (e.g., context network $C:I\rightarrow\{f^{(1)}, f^{(2)}, \ldots\}$) may be pre-trained to extract context feature maps $f^l$ of various spatial resolutions. In some embodiments, context network 1225 may be a U-Net. A U-Net is a CNN based on a fully convolutional network in which a large number of upscaling feature channels propagate context information to higher resolution layers. In some embodiments, the U-Net may be fused with individual layers of the convolution-LSTM layers by concatenating corresponding U-Net features of a same spatial resolution before each convolution-LSTM layer.

To capture a motion estimation, block motion estimate $\tau\in R^{W\times H\times 2}$ is used to warp each context feature map:

$$\hat{f}_i^{(l)} = f_{i=\tau_i}^{(l)} \tag{5}$$

Encoder network 1205, context network 1225, and decoder network 1215 (e.g., an interpolation network) see the same information to compress and decompress first subset of frames 1200 to avoid redundant encoding:

$$r_0=1 \tag{6}$$

$$b_k=E_R(r_{k-1},\hat{f}_1,\hat{f}_2,g_{k-1}) \tag{7}$$

$$r_k=r_{k-1}-D_R(b_k,\hat{f}_1,\hat{f}_2,h_{k-1}) \tag{8}$$

This interpolation process may require fewer bits to encode temporarily close frames and more bits for frames that are farther apart.

The example shown in FIG. 13 includes compressed frame features 1300, decoder network 1305, and reconstructed video 1310. Referring to FIG. 13, compressed frame features 1300 may be interpolated by decoder network 1305 in a hierarchical process. For example, a video of N frames may be divided into [N/n] sets of frames including R-frames and I-frames, where two consecutive groups of frames share a same boundary I-frame. Decoder network 1305 may use the boundary I-frames as key-frames for successive levels of interpolation to produce reconstructed video 1310. For example, in some embodiments, each I-frame may have a dimension of 32×4×4, a first hierarchical level adjacent to the I-frame may have a dimension of 16×4×4, a second hierarchical level adjacent to the first hierarchical level may have a dimension of 8×4×4, and a third hierarchical level adjacent to the second hierarchical level may have a dimension of 16×4×4, with corresponding binarized embedding sizes.

Encoder networks 1105 and 1205 are examples of, or includes aspects of, the corresponding element described with reference to FIGS. 3-5 and 12. Compressed frame features 1110, 1210, and 1300 are examples of, or includes aspects of, the corresponding element described with reference to FIGS. 3, 5-7, 9, and 15. Decoder networks 1115, 1215, and 1305 are examples of, or includes aspects of, the corresponding element described with reference to FIGS. 4-5. Reconstructed video 1120 and 1310 are an example of, or includes aspects of, the corresponding element described with reference to FIG. 5.

Figure 14:
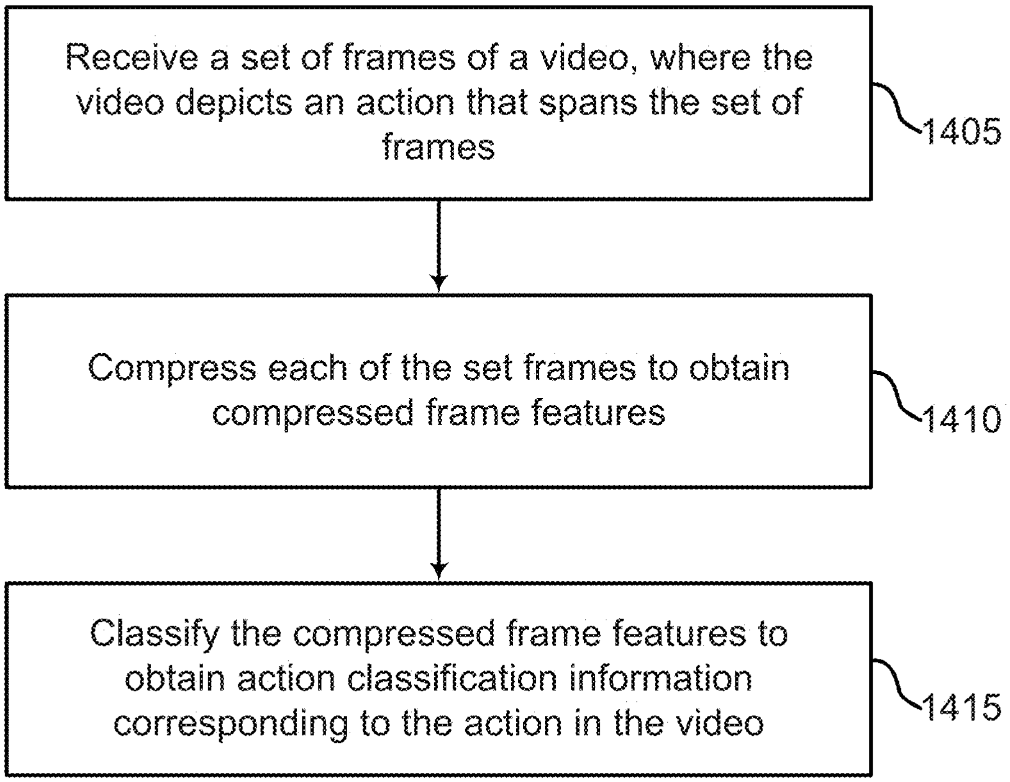
FIG. 14 shows an example of image processing according to aspects of the present disclosure.

FIG. 14 shows an example of image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Video data may be collected by cameras included in edge devices in edge locations. For example, a company may collect video from its various stores (e.g., edge locations) via edge devices. This collection of data over large periods generates large quantities of video data. Rather than transferring raw video data directly through a cloud network (in a process which may be bottle-necked by data transmission bandwidth restrictions anywhere between the site of data collection to the cloud storage devices), embodiments of the present disclosure may make use of a proximity of edge devices to the source of the video data. An edge device according to embodiments of the present disclosure may record video data using a camera and compress the collected video data using a machine learning model. The edge device may extract high-level analytical features (such as action classification information) from the compressed videos using the machine learning model. For example, the action classification information may relate to an action depicted in the video (such as movement of a person or people).

The edge device may then provide the action classification information, metadata about the action classification information, the compressed video, and/or the video data to the cloud for aggregate analytics by one or more analysts. By performing video analytics on a compressed representation of video data at an edge device, embodiments of the present disclosure may use a machine learning model that is small and requires fewer computing resources and bandwidth. An analyst may perform aggregate queries over the action classification information stored in the cloud to glean information on aggregate actions depicted in videos recorded by the edge devices, such as movement patterns, repeated movement paths through the edge locations, frequently visited spots in the edge locations, time spent at the locations, etc). Understanding these aggregate actions can provide information that may be used to optimize the layouts and placement of items in the edge locations.

Referring to FIG. 14, at operation 1405, the system receives a set of frames of a video, where the video depicts an action that spans the set of frames. In some cases, the operations of this step refer to, or may be performed by, an encoder network as described with reference to FIGS. 3-5 and 11-12. For example, the encoder network may receive video from a camera as described with reference to FIG. 15.

At operation 1410, the system compress each frame of the set frames to obtain compressed frame features. In some cases, the operations of this step refer to, or may be performed by, an encoder network as described with reference to FIGS. 3-5 and 11-12. For example, the encoder network may compress frames as described with reference to FIG. 11-13.

At operation 1415, the system classifies the compressed frame features to obtain action classification information corresponding to the action in the video. In some cases, the operations of this step refer to, or may be performed by, a classification network as described with reference to FIGS. 3-10. For example, the classification network may obtain action classification information as described with reference to FIGS. 6-10.

Figure 15:
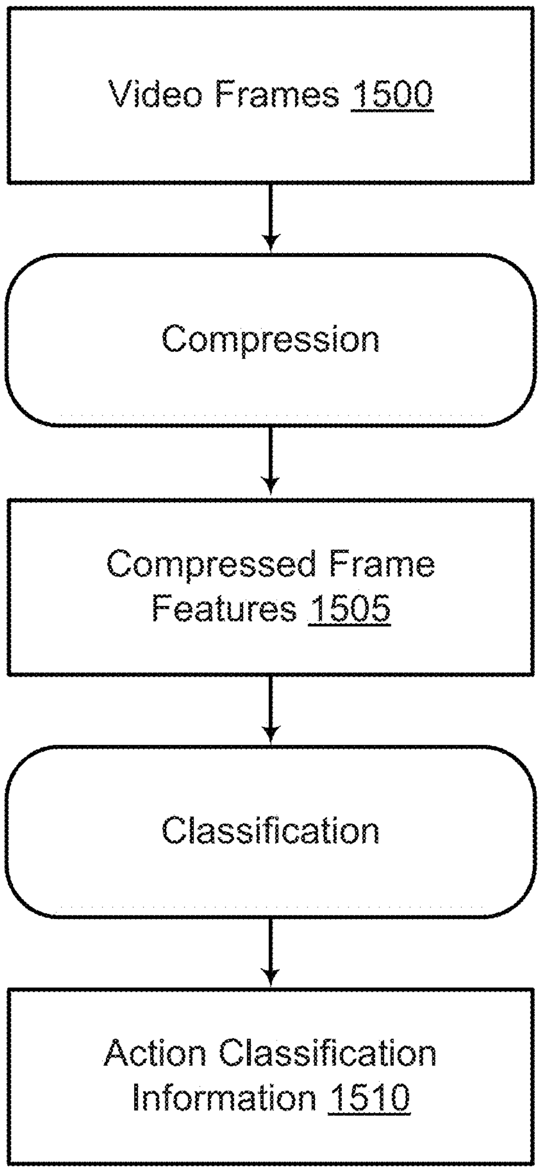
FIG. 15 shows an example of action classification according to aspects of the present disclosure.

FIG. 15 shows an example of action classification according to aspects of the present disclosure. The example shown includes video frames 1500, compressed frame features 1505, and action classification information 1510.

Referring to FIG. 15, a camera as described with reference to FIG. 4 may obtain video frames 1500. Video frames 1500 may be provided to an encoder network as described with reference to FIG. 4 as input, and the encoder network may perform compression to output compressed frame features 1505. Compressed frame features 1505 may be provided to a classification network as described with reference to FIG. 4 as input, and the classification network may perform classification to output action classification information 1510.

Compressed frame features 1505 are an example of, or includes aspects of, the corresponding element described with reference to FIGS. 3, 5-7, 9, and 11-13. Action classification information 1510 is an example of, or includes aspects of, the corresponding element described with reference to FIGS. 3 and 5-10.

Training

A method for video analysis is described. One or more aspects of the method include compressing a plurality of frames of a training video using an encoder network to obtain compressed frame features; classifying the compressed frame features using a classification network to obtain action classification information for an action in the video that spans the plurality of frames of the video; and updating parameters of the classification network by comparing the action classification information to ground truth action classification information.

Some examples of the method further include compressing a plurality of frames of a preliminary training video using the encoder network to obtain preliminary compressed frame features. Some examples further include decompressing the preliminary compressed frame features to obtain a reconstructed video. Some examples further include updating parameters of the encoder network by comparing the preliminary training video and the reconstructed video.

Some examples of the method further include compressing each frame of a first subset of the plurality of frames by iteratively encoding and reconstructing the frame to obtain first compressed frame features. Some examples further include compressing each frame of a second subset of the plurality frames by interpolating from the first compressed frame features to obtain second compressed frame features, wherein the compressed frame features include the first compressed frame features and the second compressed frame features.

Figure 16:
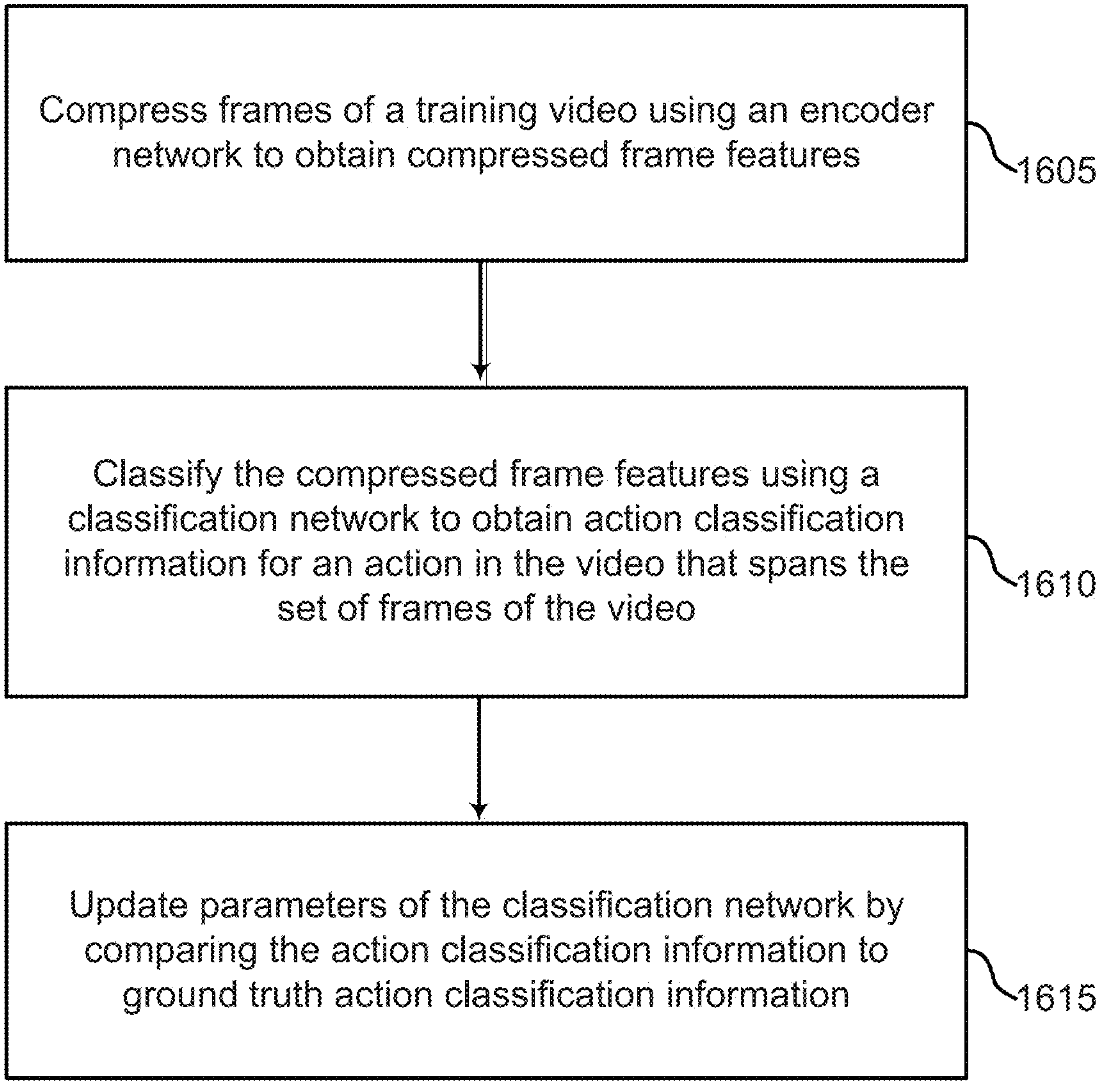
FIG. 16 shows an example of a process for training a machine learning model according to aspects of the present disclosure.

FIG. 16 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system compresses frames of a training video using an encoder network to obtain compressed frame features. In some cases, the operations of this step refer to, or may be performed by, an encoder network as described with reference to FIGS. 3-5 and 11-12.

At operation 1610, the system classifies the compressed frame features using a classification network to obtain action classification information for an action in the video that spans the set of frames of the video. In some cases, the operations of this step refer to, or may be performed by, a classification network as described with reference to FIGS. 3-10.

At operation 1615, the system updates parameters of the classification network by comparing the action classification information to ground truth action classification information. In some cases, the operations of this step refer to, or may be performed by, a training component as described with reference to FIG. 4. For example, the training component may train the classification network by comparing the action classification information to ground truth action classification information according to a cross-entropy loss function.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of processing video data, comprising:

receiving a plurality of frames of a video, wherein the video depicts an action that spans the plurality of frames;

compressing, using an encoder network, each of the plurality of frames to obtain compressed frame features, wherein the compressed frame features include fewer data bits than the plurality of frames of the video; and generating, using a classification network, action classification information by processing the compressed frame features using a first convolution network of the classification network, processing a frame of the plurality of frames using a second convolution network of the classification network, and processing an output of the first convolution network and an output of the second convolution network using a classification layer of the classification network to obtain the action classification information, wherein the action classification information comprises a prediction of a likelihood that the video depicts the action.

2. The method of claim 1, further comprising:

recording the video at an edge device; and selecting the plurality of frames of the video for classification.

3. The method of claim 1, further comprising:

compressing each frame of a first subset of the plurality of frames by iteratively encoding and reconstructing the frame to obtain first compressed frame features; and compressing each frame of a second subset of the plurality of frames by interpolating from the first compressed frame features to obtain second compressed frame features, wherein the compressed frame features include the first compressed frame features and the second compressed frame features.

4. The method of claim 1, further comprising:

decoding the compressed frame features using a three-dimensional convolution network and a fully connected layer, wherein the action classification information is based on the decoding.

5. The method of claim 4, further comprising:

performing a two-dimensional convolution operation on at least one frame of the video, wherein the fully connected layer takes an output of the three-dimensional convolution network and an output of the two-dimensional convolution operation as input.

6. The method of claim 1, further comprising:

decoding the compressed frame features using a recurrent neural network, wherein the action classification information is based on the decoding.

7. The method of claim 6, further comprising:

performing a convolution operation on at least one frame of the video, wherein a layer of the recurrent neural network takes a hidden state from a previous layer and an output of the convolution operation as input.

8. The method of claim 1, wherein:

the compressed frame features comprise a binary code.

9. The method of claim 1, further comprising:

generating the action classification information at an edge device; and transmitting the action classification information from the edge device to a central server.

10. An apparatus comprising:

an encoder network configured to compress each of a plurality frames of a video to obtain compressed frame features, wherein the encoder network is trained to compress the plurality of frames by comparing the plurality of frames to reconstructed frames that are based on the compressed frame features; and a classification network configured to generate action classification information for an action in the video that spans the plurality of frames of the video by processing the compressed frame features using a first convolution network of the classification network, processing a frame of the plurality of frames using a second convolution network of the classification network, and processing an output of the first convolution network and an output of the second convolution network using a classification layer of the classification network to obtain the action classification information, wherein the action classification information comprises a prediction of a likelihood that the video depicts the action.

11. The apparatus of claim 10, further comprising:

a camera configured to capture the video.

12. The apparatus of claim 10, further comprising:

a reporting component configured to report the action classification information to a server.

13. The apparatus of claim 10, further comprising:

a decoder network configured generate a reconstructed video based on the compressed frame features.

14. The apparatus of claim 10, wherein:

the classification network comprises a three-dimensional convolution layer and a fully connected layer.

15. The apparatus of claim 14, wherein:

the classification network comprises a two-dimensional convolution layer.

16. The apparatus of claim 10, wherein:

the classification network comprises a convolution component and a recurrent neural network.

17. The apparatus of claim 16, wherein:

the classification network comprises an attention layer.

18. A non-transitory computer readable medium storing instructions that, when executed by a processor, cause the processor to:

receive a plurality of frames of a video, wherein the video depicts an action that spans the plurality of frames;

compress, using an encoder network, each of the plurality of frames to obtain compressed frame features, wherein the compressed frame features include fewer data bits than the plurality of frames of the video; and classify generate, using a classification network, action classification information by processing the compressed frame features using a first convolution network of the classification network, processing a frame of the plurality of frames using a second convolution network of the classification network, and processing an output of the first convolution network and an output of the second convolution network using a classification layer of the classification network to obtain the action classification information, wherein the action classification information comprises a prediction of a likelihood that the video depicts the action.

19. The non-transitory computer readable medium of claim 18, wherein the instructions further cause the processor to:

compress each frame of a first subset of the plurality of frames by iteratively encoding and reconstructing the frame to obtain first compressed frame features; and compress each frame of a second subset of the plurality of frames by interpolating from the first compressed frame features to obtain second compressed frame features, wherein the compressed frame features include the first compressed frame features and the second compressed frame features.

20. The non-transitory computer readable medium of claim 18, wherein the instructions further cause the processor to:

decode the compressed frame features, wherein the action classification information is based on the decoding.

* * * * *